Figure 1:
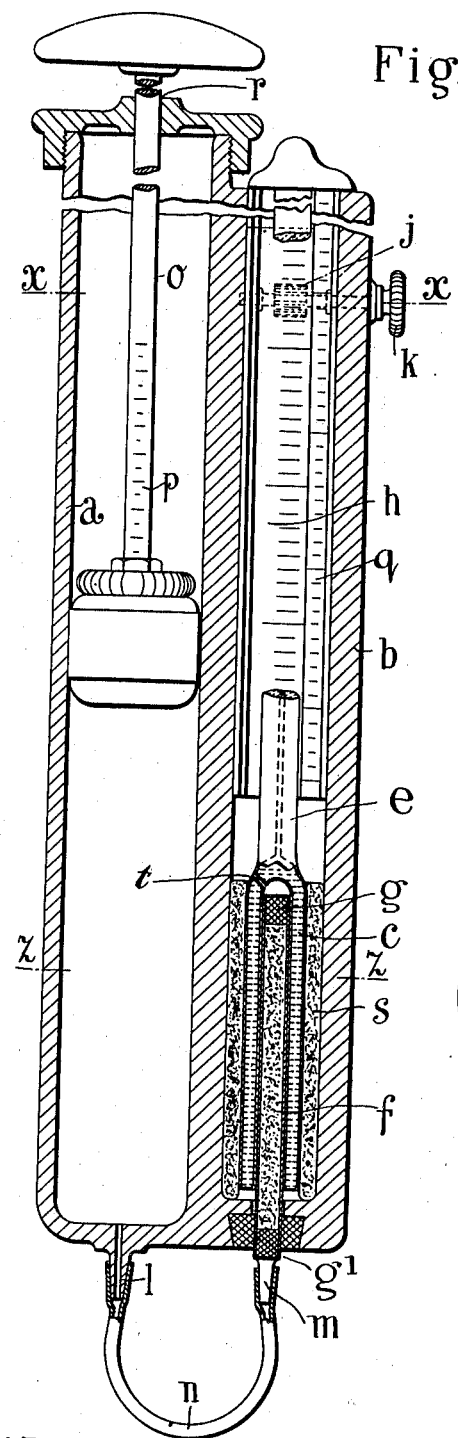

B. C. HINMAN.
MEANS FOR MEASURING OR ANALYZING GASEOUS MIXTURES.
APPLICATION FILED NOV. 5, 1909.

970,923.

Patented Sept. 20, 1910.

WITNESSES.

INVENTOR.
B. C. Hinman

UNITED STATES PATENT OFFICE.

BERTRAND CHASE HINMAN, OF LONDON, ENGLAND.

MEANS FOR MEASURING OR ANALYZING GASEOUS MIXTURES.

970,923.   Specification of Letters Patent.   Patented Sept. 20, 1910.

Application filed November 5, 1909. Serial No. 526,489.

*To all whom it may concern:*

Be it known that I, BERTRAND CHASE HINMAN, a citizen of the United States of America, and a resident of London, England, have invented a certain new and useful Improvement in Means for Measuring or Analyzing Gaseous Mixtures, of which the following is a specification.

The object of this invention is to provide a new and improved method for the quantitative determination of the constituents of mixtures of gases and while it may be carried out successfully on many gaseous mixtures, the invention will be of the greatest use in analyzing the gaseous products of combustion emitted from the furnaces of steam boilers and from metallurgical furnaces, a knowledge of the composition of these gases being of importance in enabling the fuel to be burned to the best advantage. Useful applications also exist in the preparation and use of water and producer gas, and in fact in many technical operations where rapid analyses are necessary and where it is of importance to avoid the use of delicate and complicated apparatus.

Heretofore the most usual method for analyzing gases consisted in taking a carefully measured volume of the mixture, causing it to come into contact with a reagent capable of reacting with and absorbing one or more of the constituents, and by noting the diminution of volume so produced, obtaining a measure of the quantity of the gas or gases so abstracted. Another method consists in adding a definite volume of a gas to a definite volume of the mixture to be analyzed, so as to form an explosive mixture with one or more of the constituents, and causing them to react or explode by an electric spark or otherwise, and again determining the proportion of the reacting gas by the resultant diminution of volume. Still other methods have been employed, such as direct or indirect weighing of the gases after isolation from the mixture, also by taking advantage of the property of the variation in the rate of diffusion of different gases through porous partitions. Many patents have been taken out for processes and apparatus working along these lines. My invention is based upon an entirely different principle, and takes advantage of a law of chemistry, that practically all chemical reactions take place with a definite liberation or a definite absorption of heat. In order therefore to determine one or more of the constituents of a mixture of gases, I cause a measured volume thereof to react with a definite weight of a substance with which the gas sought to be determined is capable of chemically combining, and which reaction will produce a change of temperature and then by any suitable means measure the extent of such change of temperature from which can be calculated the quantity of the gas sought to be determined.

As an illustration of one way in which the process may be used, I will describe it in connection with the liberation of heat and with the determination of carbonic acid gas ($CO_2$) in the products of combustion as taken from the flue of an ordinary furnace. A convenient form of apparatus for the purpose which may be taken as an example only, is illustrated in the accompanying drawing, in which:—

Figure 2:
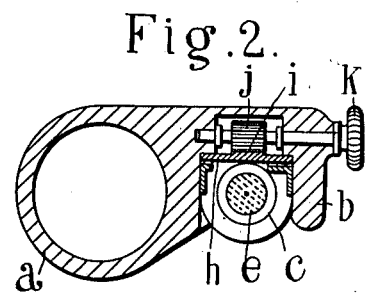
Figure 3:
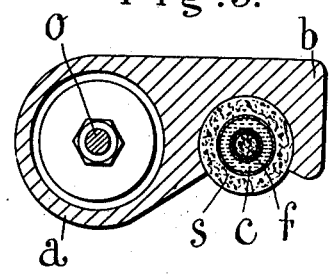

Figure 1 is an elevation partly in section of same. Fig. 2 is a cross section of Fig. 1 on line X—X, and Fig. 3 is a cross section of Fig. 1 on line Z—Z.

In such apparatus $a$ is an exhausting syringe of a capacity of say 100 cubic centimeters, upon which is mounted a thermometer case $b$, the bulb $c$ of the stem $e$ of which is adapted to form an inclosing jacket for a cartridge-shaped glass tube or suitable receptacle $f$ shown in position within this jacket. The cartridge $f$ is packed with the desired material such as caustic alkali unmixed or mixed with appropriate substances and sealed as at $g$ $g'$ with paraffin wax or other appropriate material the thermometer case $b$ having an opening in the lower end through which the cartridge can be introduced into the bulb.

The thermometer case has a movable scale $h$ at the back of its stem which may be actuated in any convenient manner, such as by the rack $i$ and pinion $j$ from a thumb screw $k$ as shown. This scale is empirically graduated for the particular instrument with mixtures or percentages of for instance, carbonic acid gas of known composition. The syringe has a nozzle $l$ and each cartridge has also a nozzle $m$ and between these two a removable connection can be made by a short piece of rubber tubing $n$.

In conducting the analyses it is proposed to operate in every case upon equal weights of the gaseous mixture, and as the volume of equal weights of gases varies with temperature and pressure a suitable correction should be made. This can be done arithmetically after observations of temperature and barometric pressure at the time of the analysis, but it is preferred, at any rate so far as temperature fluctuations are concerned, to vary the volume of gas drawn into the syringe so that equal weights at any temperature are operated upon, thus giving a direct reading on the scale $h$ of the actual percentage by weight of the contained carbon dioxid. This is accomplished by graduating the piston rod or plunger $o$ of the syringe into divisions $p$ numbered to correspond with a fixed temperature scale $q$ placed alongside the thermometer stem $e$ so that the plunger may be pulled out to the point when the division on the rod corresponding to the temperature shown by the scale $q$ just appears at the outside of the syringe casing at $r$.

In order to prevent as much as possible loss of heat by radiation from the external wall of the thermometer bulb, I may surround the bulb $c$ with a jacket, such as felt as shown at $s$.

To conduct an analysis the seals $g$ $g'$ of a cartridge $f$ are pierced to permit entrance and egress of the gas and it is inserted in the thermometer bulb. The appropriate quantity of the gas to be analyzed is then drawn into the syringe through its nozzle $l$ and the latter is then connected with the nozzle $m$ of the cartridge by means of the pipe $n$. As soon as the mercury column of the thermometer is stationary the zero of the movable scale $h$ is brought opposite the top of the column and the plunger of the syringe is depressed so as to pass its gaseous contents through the cartridge causing a reaction, resulting in the formation of sodium carbonate. Heat is thus disengaged in proportion to the carbon dioxid gas present and the mercury column rises whereupon opposite the highest point reached on the scale there will be readable the percentage by weight of the carbon dioxid gas in the mixture under analysis. It will be obvious that an opening $t$ may be made at the top of the thermometer bulb for the escape of the gases but in practice it is found that unless the cartridges are a very tight fit the gas after passing through them readily finds its way between their outer walls and the interior walls of the bulb and escapes at the bottom of the latter. For 100 c. c. of even a rich flue gas the quantity of caustic soda required to effect complete absorption will not exceed one gram and much less may suffice.

Instead of employing caustic soda there are other substances which may be successfully used, as for example caustic potash or other substance capable of reacting with the particular gas to be measured. For the determination of carbon monoxid in flue gas there can be used in place of caustic soda in the cartridge, peroxid of sodium, but in this case the mixture of gases, before being forced through the peroxid of sodium cartridge, must first be passed through caustic soda or equivalent substance to absorb the whole of the carbonic acid and this may be accomplished by first passing the gas through a cartridge of caustic soda. Instead of employing a solid absorbing reagent, solutions of these reagents in water or other substances may be with some modifications made use of, but I prefer owing to the lower specific heat of the solid reagent, as compared with a solution in water, to employ the former, as by so doing more of the heat of the reaction is liberated in the form of sensible heat, to exert itself upon the thermometer.

It will be understood that the apparatus which is here shown, in a combined form could be modified in several ways as the thermometer part for instance can be separate from the syringe; or the thermometer part could be provided with means for leaving or making a record of the height to which the column rises in any suitable or known way as in the ordinary recording thermometer.

What is claimed is:—

1. In an apparatus for analyzing gaseous mixtures comprising a receptacle containing a substance which will re-act with the constituent of the gas to be determined with the production of a change of temperature, means for delivering a measured quantity of the gas to be analyzed to said receptacle, and means for measuring the change in temperature so produced.

2. In an apparatus for analyzing gaseous mixtures comprising a receptacle containing a substance which will re-act with the constituent of the gas to be determined with the production of a change of temperature, means for forcing a measured quantity of the gas to be analyzed into the receptacle and means for measuring the change of temperature so produced.

3. In an apparatus for analyzing gaseous mixtures a cartridge like vessel containing a substance which will re-act with the constituent of the gas to be determined with the production of a change of temperature, means for introducing a measured quantity of the gas to be analyzed into the vessel and a thermometer placed in proximity to the vessel to indicate the change in temperature so produced.

4. In an apparatus for analyzing gaseous mixtures a receptacle containing a substance which will re-act with the constituent of the gas to be determined with the production of a change of temperature, a syringe adapted to draw in a measured quantity of the gas to be analyzed and to force same out into the receptacle and a thermometer in proximity to said receptacle to indicate the change of temperature so produced.

5. In an apparatus for analyzing gaseous mixtures a receptacle containing a substance which will re-act with the constituent of the gas to be determined with the production of a change of temperature, means for admitting a measured quantity of the gas to be analyzed into said receptacle, a thermometer in proximity to the receptacle to indicate the change of temperature so produced and a movable graduated scale reading percentages of the constituent of the gas to be determined in proximity to the stem of the thermometer.

In testimony whereof I have hereunto set my hand in the presence of two subscribing witnesses.

BERTRAND CHASE HINMAN.

Witnesses:
R. WESTACOTT,
HERBERT D. JAMESON.